United States Patent
Still (10) Patent No.: US 6,941,663 B2
(45) Date of Patent: Sep. 13, 2005

(54) CABLE CUTTER

(75) Inventor: Thomas E. Still, Stadtallendorf (DE)

(73) Assignee: Harry P. Will Werkzeugfabrik GmbH & Co. KG, Neustadt/Hessen (DE)

( * ) Notice: Subject to any disclaimer, the term of this patent is extended or adjusted under 35 U.S.C. 154(b) by 0 days.

(21) Appl. No.: 10/316,888

(22) Filed: Dec. 12, 2002

(65) Prior Publication Data

US 2003/0110642 A1 Jun. 19, 2003

(30) Foreign Application Priority Data

Dec. 14, 2001 (DE) ................................ 201 20 275 U (51) Int. Cl.⁷ ............................................. B26B 13/26
(52) U.S. Cl. ............................ 30/250; 30/251; 30/252; 30/254
(58) Field of Search ....................... 30/250, 254, 251, 30/249, 252, 270, 192, 244, 245, 246, 134, 135, 186–190, 92; 81/314, 405–413, 416

(56) References Cited

U.S. PATENT DOCUMENTS

| 993,646 | A | * | 5/1911 | Dec'D | 30/250 |
|---|---|---|---|---|---|
| 1,123,243 | A | | 1/1915 | Champ | |
| 1,533,039 | A | * | 4/1925 | Shirk | 30/250 |
| 2,348,903 | A | * | 5/1944 | Hart | 30/254 |
| 2,370,308 | A | * | 2/1945 | Hanson | 81/329 |
| 2,384,822 | A | * | 9/1945 | Drmic | 30/250 |
| 2,410,889 | A | | 11/1946 | Martines | |
| 2,445,480 | A | * | 7/1948 | Plannie | 81/382 |
| 3,851,389 | A | * | 12/1974 | Swanson | 30/250 |
| 4,296,655 | A | * | 10/1981 | Tesoro | 81/405 |
| 4,669,340 | A | * | 6/1987 | Igarashi | 81/416 |
| 4,957,020 | A | * | 9/1990 | Monceret | 81/414 |
| 5,904,078 | A | * | 5/1999 | Gustafson et al. | 81/417 |
| 5,974,670 | A | | 11/1999 | Hsieh | |
| 6,532,847 | B2 | * | 3/2003 | Liou | 81/416 |
| 2001/0006001 | A1 | | 7/2001 | Battenfeld | |
| 2002/0046466 | A1 | * | 4/2002 | Deville | 30/270 |
| 2003/0140742 | A1 | * | 7/2003 | Nouvel | 81/409 |

FOREIGN PATENT DOCUMENTS

| DE | G 87 16 229.6 | 3/1988 |
|---|---|---|
| DE | 19963097 C1 | 12/1999 |
| DE | 20104732 U | 3/2001 |
| EP | 1 147 859 A2 | 10/2001 |

* cited by examiner

Primary Examiner—Allan N. Shoap
Assistant Examiner—Ghassem Alie
(74) Attorney, Agent, or Firm—Clark & Brody (57) ABSTRACT

In a cable cutter (10) for cutting cables, leads, pipes and the like, two intersecting levers (14, 16) are articulated by a common first pivot joint (12). One of the levers (14, 16) consists of two parts, a front lever section (26) forming a cutting jaw (22, 24) and a rear lever section (28) forming a handle (20). These lever sections (26, 28) are articulated by a second pivot joint (30) and are interlockable in at least two distinct angular positions (32, 34). A limit by way of a glide means (38) is guided in a recess (36) for engagement of an associated recess each (40, 42) in the distinct angular positions (32, 34) of the lever sections (26, 28). There, the glide means (38) is automatically lockable, being preferably a spring-loaded pin supported on the front lever section (26) for movement in a longitudinal direction, either parallel or at a right angle to the axes of rotation (A1, A2) of the pivots joints (12, 30). The pin side facing the rear lever section (28) may be widened or broadened. In the rear lever section (28) concentrical to the second pivot joint (30), the guide recess (36) is an oblong hole (46) least the ends of which include engaging recesses (40, 42), e.g. blind holes. The lever sections (26, 28) may widely overlap at their facing ends (58, 60), and preferably the rear lever section (28) includes a projection (62) pointing toward the other lever (14) and resting against it when the levers (14, 16) are closed. A setting device serves for readjusting the cutting jaws (22, 24) which may have replaceable cutting edges.

11 Claims, 7 Drawing Sheets

CABLE CUTTER

Cable cutters and cable shears of varying types are used for cutting pipes, cables and leads e.g. of copper, steel, piano wire or glass fibers.

A known cable shears consists e.g. of two intersecting levers articulated by a pivot joint. Each of the two levers to be actuated by one hand has a cutting jaw above the joint and is shaped below as a handle. Because of the long handles, the user can exert relatively high cutting pressures. In one-hand operation, however, only leads having small cross-sections may be cut because the handwide opening of the handles will only permit limited opening of the cutting jaws.

It is an aim of the invention to overcome these and other disadvantages of the prior art and to create a cable cutter which is cheap and easy to manufacture and which is adapted to easily cut thin or thick leads. One-hand operation shall be possible. Moreover, easy and uncomplicated handling and a high degree of operational safety at any time are strived for.

In a cable cutter for cutting cables, leads, pipes and the like, comprising two intersecting levers which are articulated by a common first pivot joint, each of said levers having a handle in its lower section and a cutting jaw in its upper section, the invention provides that one of the levers consists of two parts, a front lever section forming the cutting jaw and a back lever section forming the handle, the lever sections being articulated by a second pivot joint and being interlockable relative to each other in at least two distinct angular positions.

With this design of a cable cutter to be realized easily as well as cheaply, the user will be always able to position the two handles at an angle that permits comfortable and safe operation with one hand. One-hand operation is also still possible in an extremely wide opening position of the cutting jaws, e.g. for up to 25 mm diameter thick cables, so that thin as well as thick leads may be easily cut. Other tools or accessories are not required. Locking of the lever sections in their respective distinct angular positions prevents that the lever sections would be readjusted during the complete operation or would even be moved inadvertently, which is important for the operational safety. The user will always have a good grip on the cable cutter in its optimum position.

The possibility of bringing the handles of a wide open tool into a narrower position to be seized with one hand has already been known with pressing tools for jointing components like pipes or cable lugs. For this purpose, in a pair of pliers for multiple-stage pressing of a work piece in a few pressing stages as disclosed in DE-C1-199 63 097, at least one of the hand levers is subdivided into two partial levers. These two partial levers may be coupled in a certain angular position so that the end zones of the two levers opposite a collet head may be enclosed and be pressed together by the fingers of at least one hand even if the levers are wide open. DE-U1-201 04 732, too, describes a pair of pressing pliers which permit one-hand operation with wide open pressing jaws. This is likewise achieved by subdividing a movable handle into two grip positions so that the movable handle may be brought into a bent or kinked position. A substantial disadvantage of such known pressing pliers is, however, that the partial levers are safeguarded against bending by a simple bolt in their extended position only whereas the bent position of the partial levers is not protected at all so that the pliers may be readjusted inadvertently when they are openend, which may cause handling problems. Moreover, the bolt engages behind a separate connecting piece whereby the manufacture is not only complicated but also expensive.

Compared with this design, the locking possibility of the articulated lever sections provided by the invention offers a particular advantage. It ensures that the lever sections will remain in an intended angular position in whatever working position of the cable cutter, whereby handling is considerably facilitated. Inadvertent readjustment of the cutter during opening or closing is no longer possible. Even with extremely thick cables, the cable cutter will always ensure a clean cut through a lead.

The turning movement of the lever sections between the distinct angular positions is limited by a glide means guided in a recess, the glide means being or forming an engaging element. This arrangement ensures that the lever sections cannot be moved toward each other in the second pivot joint without restriction and that they therefore still form, as a whole, an easily operable lever even in a bent position. Moreover, the use of the glide means as a locking element considerably reduces the overall design expenditure, whereby a positive effect on the manufacturing costs is achieved.

The glide means will not only limit the turning movement of the lever sections toward each other. It is adapted to also be forced into engagement with a corresponding recess each in the distinct angular positions of the lever sections and is automatically lockable therein. This is particularly advantageous because only the locking engagement of the glide means will guarantee that the angular position of the lever sections relative to each other is maintained even when great forces are exerted on the levers. Moreover, the automatic locking of the glide means simplifies its actuation.

If possible, the glide means should be of a space-saving design in order that a small-volume cable cutter is created which will also be usable in a cramped working environment. This is achieved in a simple way by a spring-loaded pin supported so as to be movable in longitudinal direction. In another embodiment of the cable cutter, this pin is arranged parallel to the axes of the pivots. It penetrates both lever sections and protrudes outward from the front lever section. Such an arrangement will always be suitable if a short but not necessarily flat cable cutter is required, whose handles reach out as far as to the front lever section.

Where a very flat structure is required, the pin is arranged at a right angle to the axes of the pivots. Normally it is located on the handle side below the front lever section. For example, it may be designed so that it will not reach beyond the height of the front lever section and may always be operated by the gripping hand.

The pin is arranged on the front lever section, and its side facing the rear lever section is widened or broadened. This is advisable for the invention because in order to prevent wrong handling, the pin may, on its way through the guide recess, only be locked in the distinct engaging recesses. The arrangement of the pin on the front lever section will facilitate the replacement of a pressure spring attached to the pin, if that is required after intensive use of the cable cutter.

Important is the aspect wherein the guide recess is an oblong hole arranged concentrically to the second pivot joint in the rear lever section, at least the ends of the oblong hole having engaging recesses. These engaging recesses are blind hole which will safely hold the thick end of the pin in the respective engaging position. At the same time, it is prevented that the pin would engage in the other sections of the oblong hole. Moreover, owing to the concentric location of the oblong hole, the lever sections may be easily turned around the second pivot joint when the pin is released.

According to another embodiment, the lever sections overlap widely at their ends facing each other. This will ensure a reliable interaction between the second pivot joint and the glide means, with the lever sections supporting each other.

A further development of the invention is wherein one of the levers has a projection pointing toward the other lever and resting against the opposite lever when the levers are closed. The projection acts as an advantageous protection against jamming and may be formed e.g. on the rear lever section. The size of the projection will define how far the cutting jaws of the levers—in the angular positions of the lever sections predetermined by the locked glide means— may be moved toward each other.

The invention also provides that a section of the cutting jaws are provided with keen edges. Moreover, the comfortable use of the cable cutter is increased by a setting device for readjustment of the cutting jaws. In a complementary embodiment, the cutting jaws are additionally provided with replaceable cutting edges. This makes the cable cutter more user-friendly and renders time-consuming and costly regrinding of the cutting edges superfluous.

Further aspects, details and advantages of the invention will follow from the wording of the claims as well as from the following description of embodiments on the basis of the drawings wherein:

Figure 1:
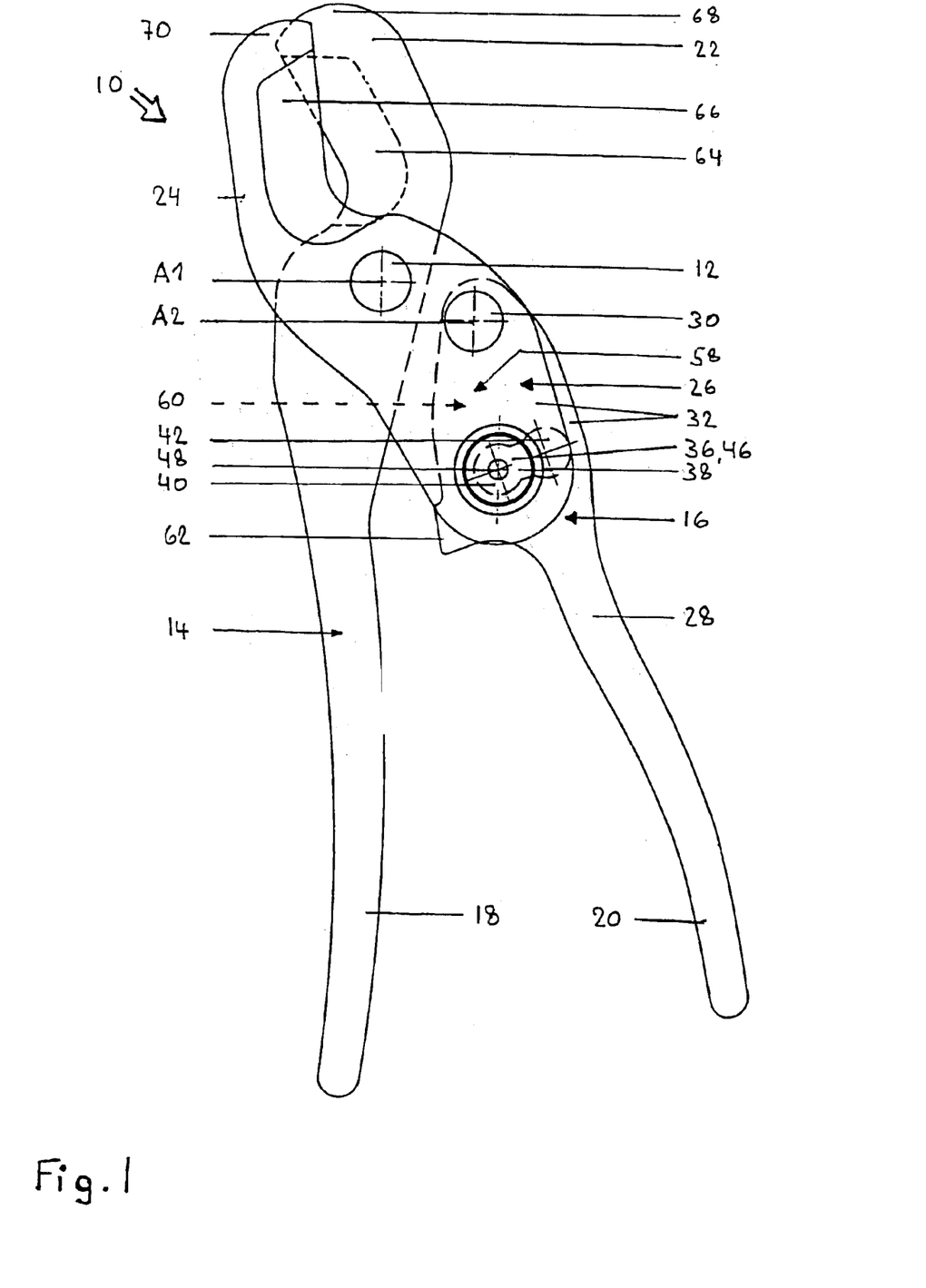
FIG. 1 is a top view of a cable cutter.

The cable cutter generally designated by 10 in FIG. 1 consists of a first lever 14 and a second lever 16 which may be turned crosswise relative to each other in a first pivot joint 12. The first lever 14 has a first handle 18 and a first cutting jaw 22, the second lever 16 has a second handle 20 and a second cutting jaw 24. The handles 18, 20 and the cutting jaws 22, 24 are arranged at opposite ends of the levers 14, 16 whereas the first pivot joint 12 with the corresponding axis of rotation A1 is located between the handles 18, 20 and the cutting jaws 22, 24.

The second lever 16 is subdivided into a front lever section 26 and a rear lever section 28, which sections may be turned relative to each other in a second pivot joint 30 around an axis of rotation A2. At the same time, they engage into each other via of a glide means 38 guided in a recess 36. This arrangement limits the possibility of turning the lever sections 26, 28 around the axis A2, the glide means 38 guided in the recess 36 defining the angular positions that can be taken by the two pivoted lever sections 26, 38 relative to each other.

In order that the two lever sections 26, 28 be lockable in certain angular positions, the glide means 38 engage in recesses 40, 42. These are parts of the guide recess 36 and are preferably designed as blind holes located as circular extensions at both ends of the guide recess 36.

Figure 2:
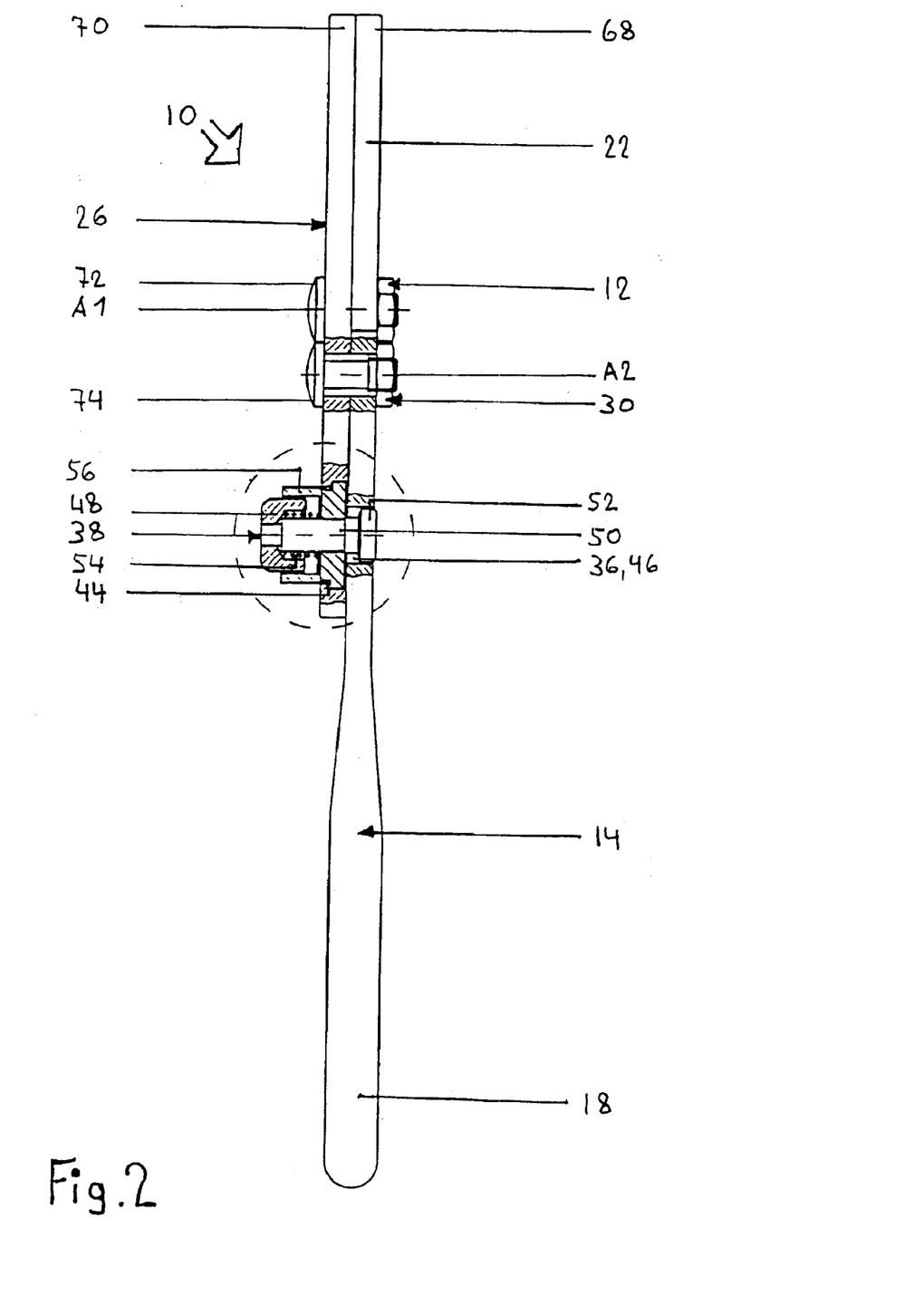
FIG. 2 is a lateral view of the cable cutter of FIG. 1, partially sectional.

As shown in FIG. 2, the front lever section 26 has a threaded hole 44 below the axis of rotation A2 arranged so that it will always be above the guide recess 36 when the lever sections 26, 28 are turned, which is possible owing to the fact that the guide recess 36 provided in the rear lever section 28 is designed as a curved oblong hole running concentrically to the axis of rotation A2 of the second pivot joint 30. Accordingly, the glide means 38 will also always move concentrically to the axis A2.

Figure 3:
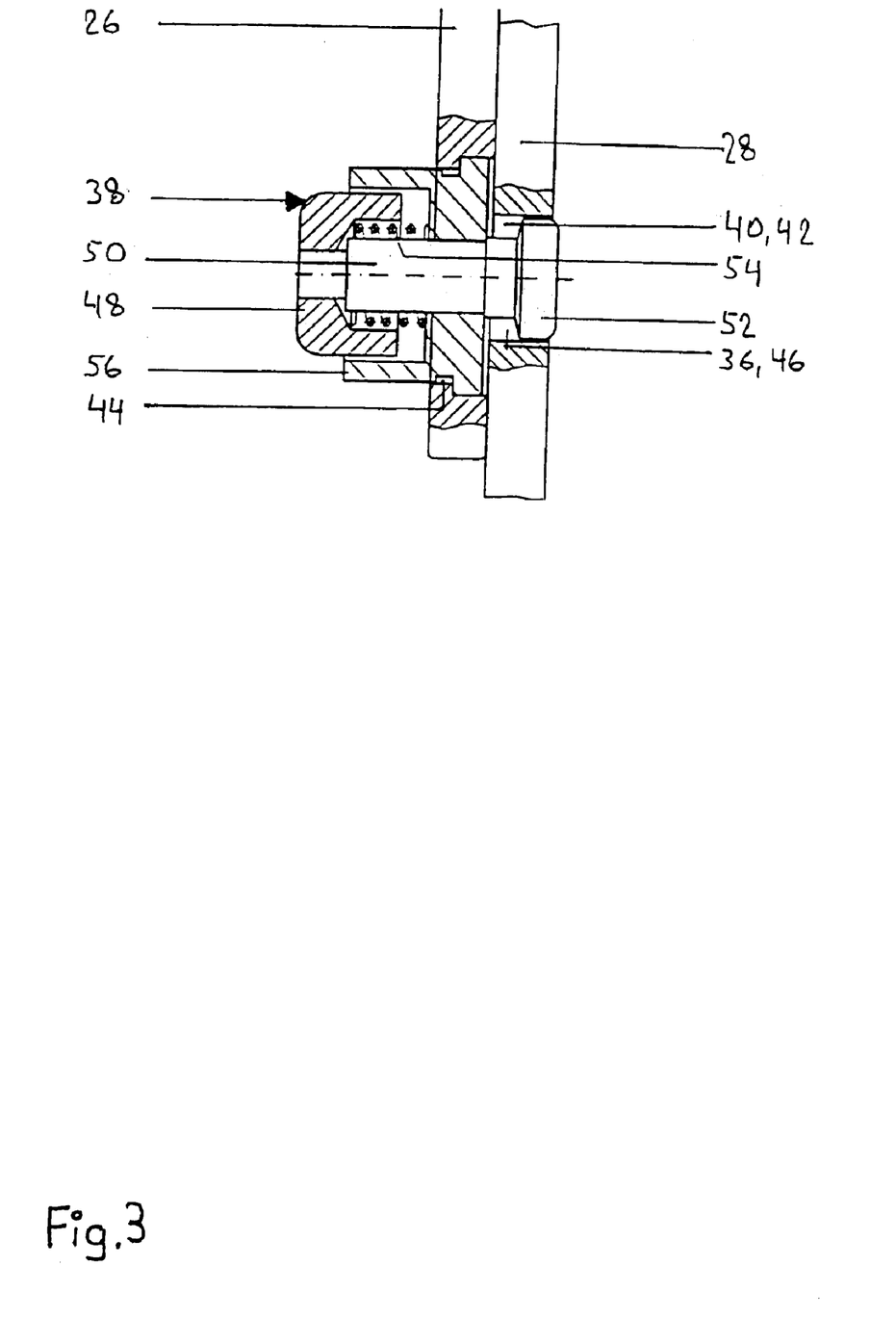
FIG. 3 is an enlarged sectional view of a glide means of the cable cutter of FIG. 3 guided in a recess.

As seen in FIG. 3, the glide means 38 may consist of a press fastener 48 screwed on a spring-loaded pin 50 supported to be movable in longitudinal direction. At its bottom side facing the oblong hole 46, the pin 50 is designed bulged out as a mushroom head 52. The outer diameter of the mushroom head 52 is dimensioned so that it may engage completely in one of the two blind holes 40, 42 of the guide recess 36 only.

As the press fastener 48 is actuated, it presses the pin 50 backward through the two lever sections 26, 28. At the same time, a pressure spring 54 slipped over the pin 50 is compressed and forced against a cylindrical receiving bush 56 screwed into the threaded hole 44. The mushroom head 52 of the pin 50 will thus come out of the first engaging recess 40, and the lever sections 26, 38 will be released from their engagement 32 defining a first angular position.

By turning the lever sections 26, 28 around the axis of rotation A2 the lever 16 gets into a kinked or bent position. As soon as the mushroom head 52 has left the engaging depression 40, the glide element 38 can be moved along the oblong hole 46 on a partial orbit until the lever 16 takes a second angular position defined by the length of the oblong hole 46 and the position of the second engaging recess 42, respectively. As soon as the lever sections 26, 28 reach their final positions, the mushroom head 52 of the pin 50 is located directly above the second engaging recess 42. The pressure spring 54 relaxes, and the mushroom head 52 sinks automatically into the second engaging recess 42. Now the two lever sections 26, 28 are arranged in a bent position relative to each other and are safely locked by engagement in this second angular position 34.

If the glide means 38 is not moved into the second engaging recess 42, but left in a position between the two engaging recesses 40, 42, it will not engage. The mushroom head 52 of the pin 50 will rest on the outside of the narrow part of the oblong hole 46 between the blind holes and will not be safeguarded against displacement. However, as soon as a force is applied on the lever sections 26, 28 or on the cutting jaws 22, 24, the lever sections 26, 28 will immediately move into their defined angular position, the engaging pins 50, 52 engaging automatically into the corresponding engaging recesses 42.

Figure 4:
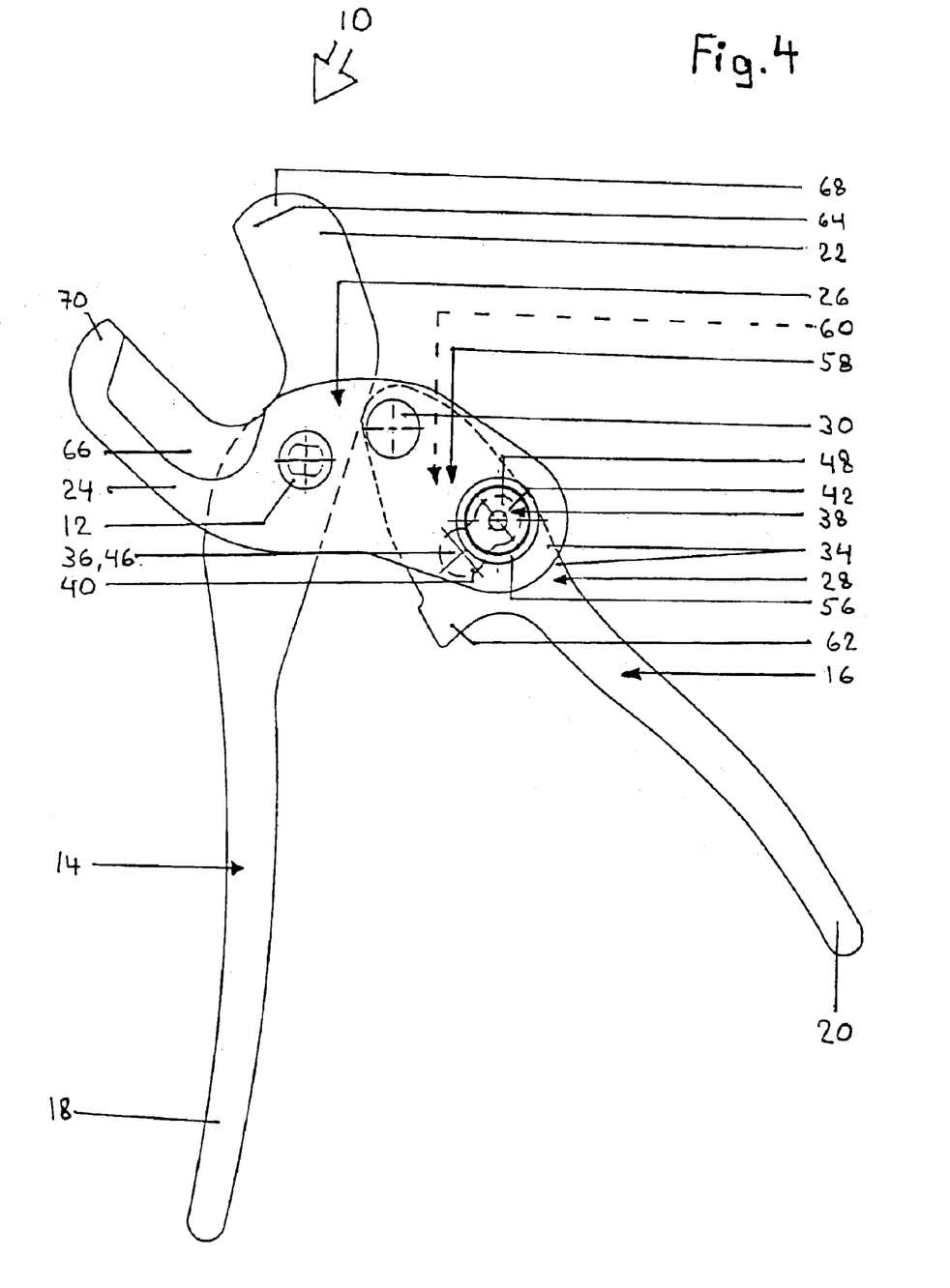
FIG. 4 is a top view of the opened cable cutter of FIG. 1.

It will be seen in FIG. 4, for example, that the lever sections 26, 28 overlap widely at their ends 58, 60 facing each other. Located in these zones are the pivot 30, the glide means 38, the threaded hole 44 as well as the guide recess 36 so that the lever 16 will have an altogether high stability in any angular position.

Figure 5:
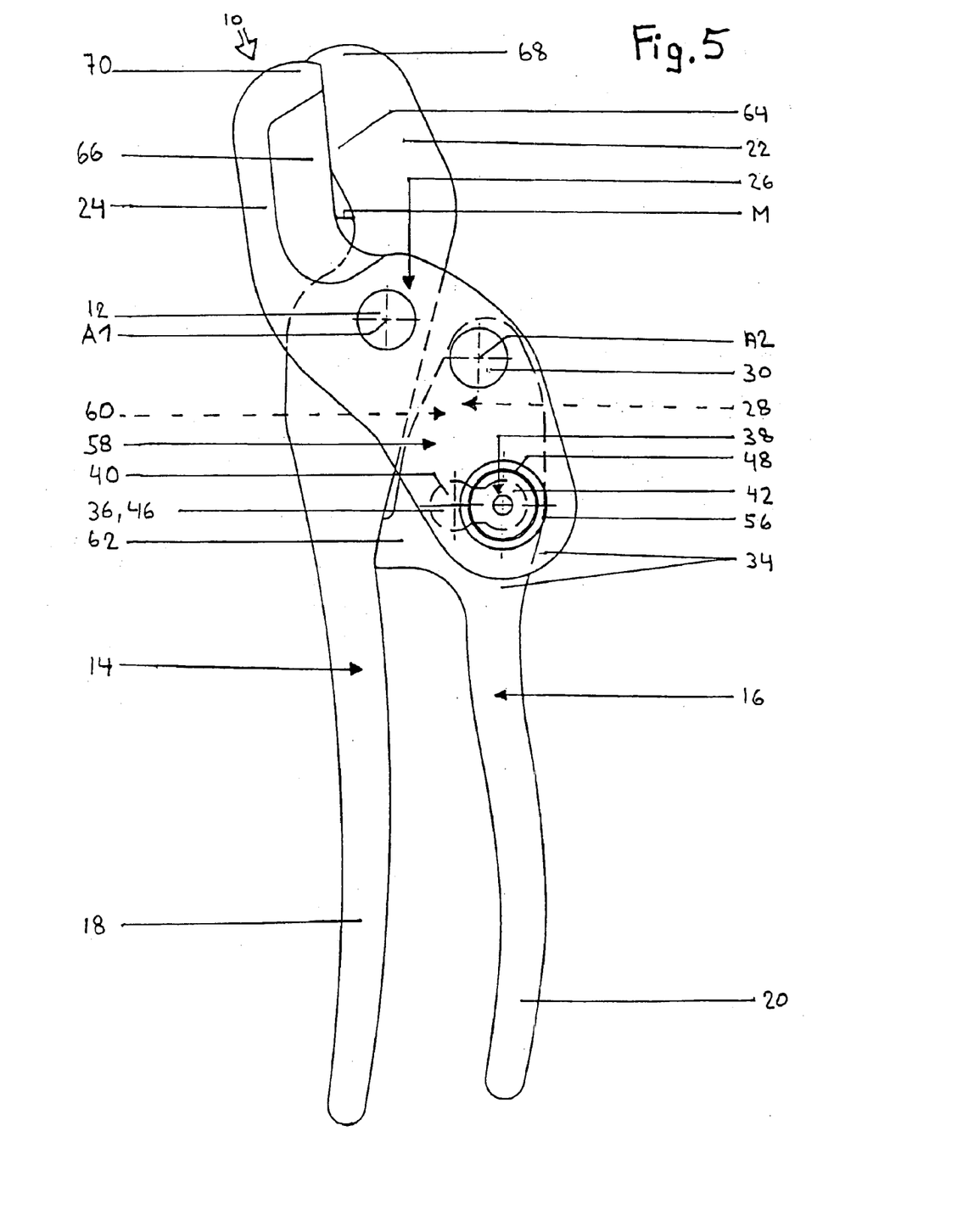
FIG. 5 is a top view of the cable cutter of FIG. 1 in closed position.

The end 60 of the rear lever section 28 has an additional projection 62 which is preferably located between the guide recess 36 and the second handle 20. It points toward the first lever 14 and is shaped so that it will rest against the first lever 14 in any angular position of the lever sections 26, 28. Thus it is first of all achieved that parts of the body that come between the levers 14, 16 inadvertently will not be jammed when the cutter is closed. Furthermore, the projection 62 ensures that in a selected angular position of the lever 26, the cutting jaws 22, 24 can only be moved toward each other up to a certain point; consequently they must have a minimum distance M between them. This minimum distance M shown in FIG. 5 is not only defined by the projection 62 but also by the design of the distinct angular positions 32, 34 of the lever sections 26, 28. The size of the minimum distance M determines how deep the cutting jaws 22, 24 of the cable cutter 10 will penetrate the lead to be cut in a selected angular position 32, 34.

A protection against injuries is also provided on the cutting jaws 22, 24. These are flattened into thin cutting edges 64, 66 at the sides facing each other. But this flattening does not continue as far as the end zones 68, 70 of the cable cutter 10. On the contrary, these end zones 68, 70 are equally thick as the outer sides of the cutting jaws 22, 24 for protection of the user.

Furthermore, the cable cutter 10 may be provided with a setting device (not shown) for readjustment of the cutting jaws 22, 24 and/or the cutting edges 64, 66. Readjustment is most easily done by means of an open-end wrench, a screw driver or the like acting upon a hinge pin 72 of the first pivot provided with a plastic insert (not shown). In order that the lever sections 26, 28 are also kept at a constant distance from each other, another adjusting device is provided, e.g. by way of a turning pin 74 with a plastic insert (not shown) on the second pivot joint 30.

The mode of function of the cable cutter 10 according to the invention is shown in FIGS. 4 to 7. The cable cutter 10 is preferably used for cutting leads. With corresponding nitride, phosphate or carbide hardening of the blades 64, 66 or when using zinc/nickel or zinc/nickel/chromium platings, it may also be used for cutting metal foils and sheets. Cutting edges 64, 66 made of titanium nitride, tungsten carbide, boron carbide or corresponding carbon nitrides will suit this purpose equally well. Thick leads are no obstacle for the cable cutter 10 either and can be cut in one-hand operation because, owing to the different angular positions 32, 34 to be adopted by the lever sections 26, 28, varying opening widths of the cutting jaws 22, 24 may be fixed. The slightly bent handles 18, 20 will retain such a distance between them that they may still be grasped with one hand.

Figure 6:
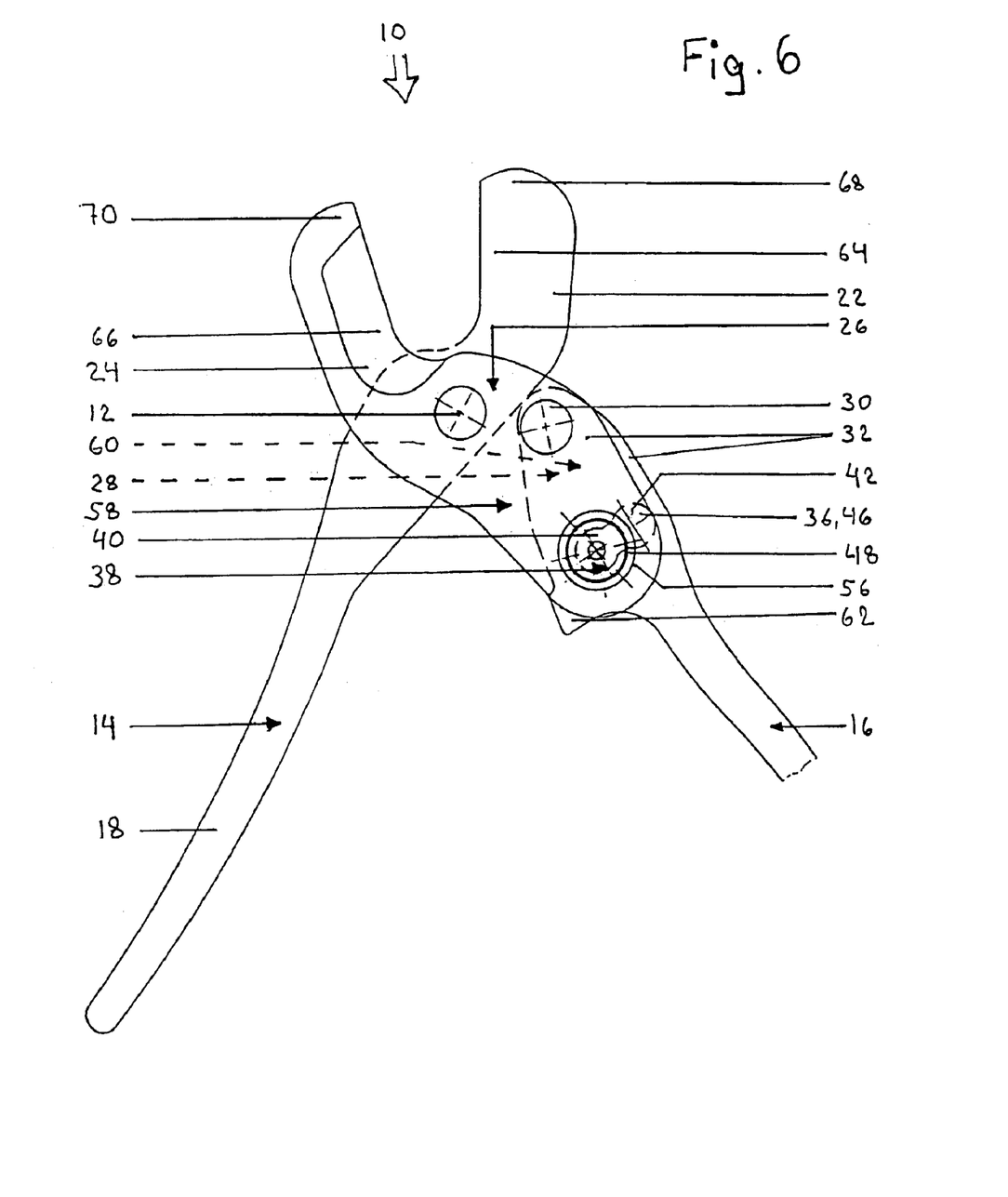
FIG. 6 is a top view of the cable cutter of FIG. 1 in another open position.
Figure 7:
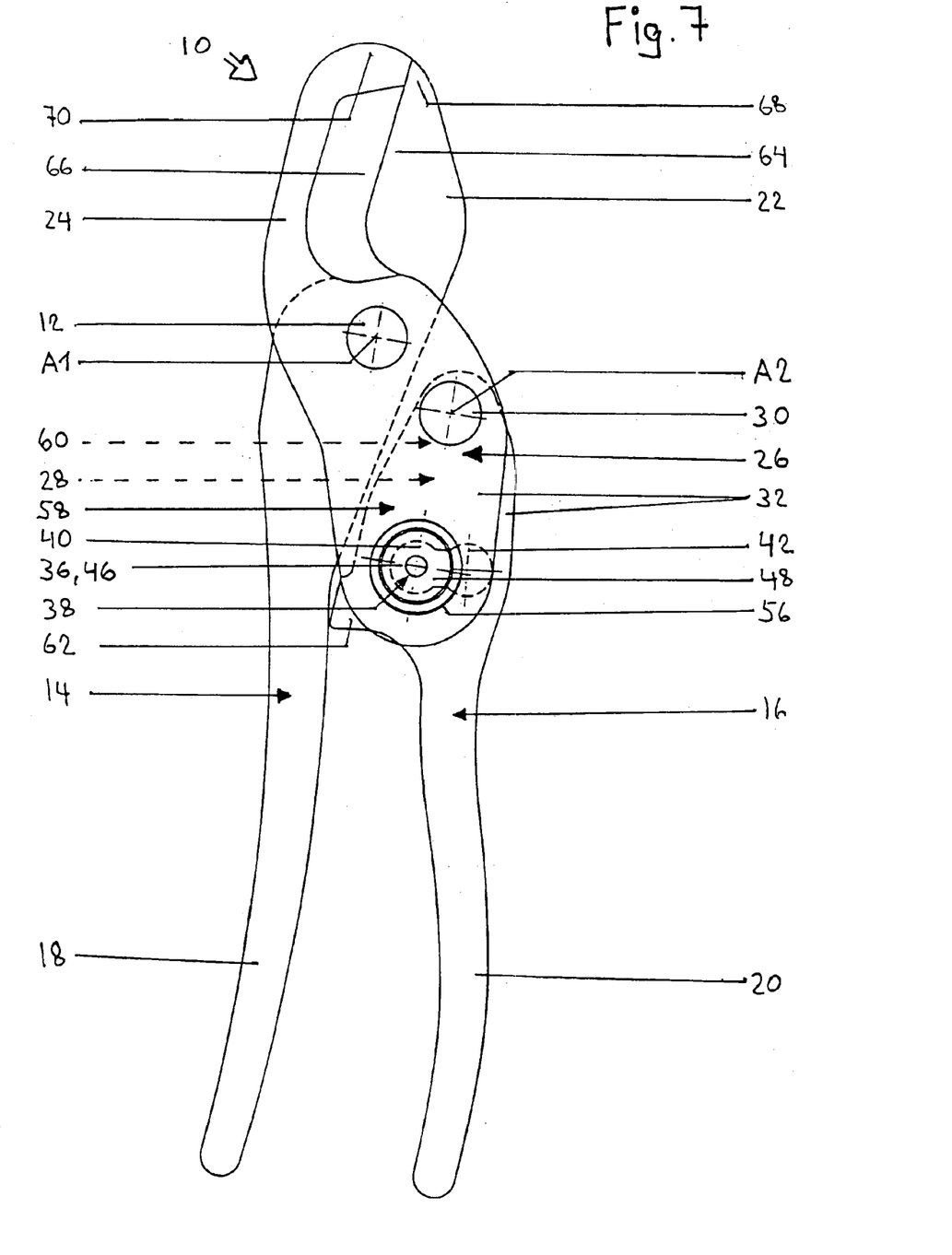
FIG. 7 is a top view of the cable cutter of FIG. 1 in closed position.

For cutting a lead, the cable cutter 10 is first brought into the opened position shown in FIG. 4, and the work piece (not shown) to be cut is inserted. The glide means 38 is locked in the second engaging recess 42, and the lever sections 26, 28 have a defined angular position relative to each other so that they form an angular lever 16. When the first lever 14 and the second angular lever 16 are pressed together, the cutting jaws 22, 24 will move toward each other. As shown in FIG. 5, the blades 64, 66 have a distance M between them when the cutter is in closed position in which the projection 62 rests against the first lever 14. As the cutting jaws 22, 24 cannot be closed completely, the lead to be cut will not be severed completely. Rather, severing will be done in a second step whereby the glide means 38 is released from the second engaging recess 42, as shown in FIG. 6, and is moved into the first engaging recess 40 by turning the lever sections 26, 28. Then the two lever sections 26, 28 will assume another angular position relative to each other in which the lever 16 is no longer angular, but extended. As the two levers 14, 16 are now moved toward each other up to the stop defined by the projection 62, the cutting jaws 24, 25 will completely close and the lead can be cut completely.

The invention can be modified in many ways without being in any manner being restricted to the embodiments described above. For example, more than two engaging recesses 40, 42 may be provided in the guide recess 36 in the form of blind holes. Owing to such arrangement, the two lever sections 26, 28 may be interlocked in more than two distinct angular positions 32, 34. This means that a cutting process is not performed in two steps, but in as many steps as there are engaging recesses.

A flat shape of the cable cutter 10 may be obtained by arranging a glide means at a right angle to the axes of rotation A1, A2. This is possible if the cable cutter 10 has longer levers 14, 16 so that a spring-loaded pin acting as a glide element may be fastened horizontally on the rear lever section 28 of the second lever 16 and may engage into engaging recesses of the front lever section 26 located on the handle side.

In order to make the minimum distance M taken by the cutting jaws 22, 24 in the distinct angular positions 32, 24 variable, the projection 62 may be movable by means of an adjusting device. The minimum distance M may also be altered if the cable cutter 10 has interchangeable cutting edges 64, 66 of different widths.

All and any of the features and advantages of the invention, inclusive of design details, of spatial arrangements and of process steps, as evident from the claims, the specification and the drawings, may be inventionally substantial per se and in most variegated combinations.

REFERENCE LIST

A1 axis of rotation of the first pivot
A2 axis of rotation of the second pivot
M minimum distance
10 cable cutter
12 first pivot joint
14 first lever
16 second lever
18 first handle
20 second handle
22 first cutting jaw
24 second cutting jaw
26 front lever section
28 rear lever section
30 second pivot joint
32 first angular position
34 second angular position
36 (guide) recess
38 glide means
40 first engaging recess
42 second engaging recess
44 threaded hole
46 oblong hole
48 press fastener
50 pin
52 (pin) mushroom head,
54 pressure spring
56 receiving bush
58 end of front lever section
60 end of rear lever section
62 projection
64 first cutting edge
66 second cutting edge
68 first end zone
70 second end zone
72 hinge pin
74 turning pin

What is claimed is:

1. Cable cutter (10) for cutting cables, leads, pipes and the like, comprising two intersecting levers (14,16) which are articulated by a common first pivot joint (12), said levers (14,16) each having in its lower section a handle (18,20) and in its upper section a cutting jaw (22,24), whereby one of said levers (14,16) consisting of two parts, one front lever section (26) forming the cutting jaw (22,24) and one rear lever section (28) forming the handle (20), and whereby said lever sections (26,28) being articujated by a second pivot joint (30), wherein a) said lever sections (26,28) are interlockable relative to each other in at least two distinct angular positions (32,34),
b) the turning movement of the lever sections (26,28) between the at least two distinct angular positions (32,24) is limited by a glide element (38) guided in a guide recess (36),
c) the guide recess (36) is an oblong hole (46) arranged in the rear lever section (28) concentric with the second pivot joint (30), at least the ends of the oblong hole (46) being provided with engaging recesses (40,42), and
d) said glide element (38) forms an engaging element that is adapted to engage one of the engaging recesses (40,42) in said distinct angular positions (32,34) of the lever sections (26,28).

2. Cable cutter according to claim 1, wherein the glide element (38) is automatically lockable in the engaging recess (40,42) in said distinct angular positions (32,34) of the lever sections (26,28).

3. Cable cutter according to claim 1, wherein the glide element (38) is a spring-loaded pin supported to be movable in longitudinal direction.

4. Cable cutter according to claim 3, wherein the pin (50) is arranged parallel to the axes of rotation (A1,A2) of the pivots joints (12,30).

5. Cable cutter according to claim 3, wherein the pin (50) is arranged on the front lever section (26).

6. Cable cutter according to claim 3, wherein the side of the pin (50) facing the rear lever section (28) is widened or broadened.

7. Cable cutter according to claim 1, wherein the engaging recesses (40,42) are blind holes.

8. Cable cutter according to claim 1, wherein the lever sections (26,28) widely overlap at their ends (58,60) facing each other.

9. Cable cutter according to claim 1, wherein one of the levers (14,16) has or forms a projection (62) pointing toward the respective other lever (14) and resting against the opposite lever (14) when the levers (14,16) are closed.

10. Cable cutter according to claim 9, wherein the projection (62) is formed on the rear lever section (28).

11. Cable cutter according to claim 1, wherein at least sections of the cutting jaws (22,24) are provided with keen edges (64,66).

* * * * *